(12) United States Patent
Benn et al.

(10) Patent No.: US 8,409,535 B2
(45) Date of Patent: Apr. 2, 2013

(54) SYSTEM AND METHOD FOR REMOVING A CONTAMINANT FROM A GAS STREAM

(75) Inventors: Brian Benn, Santa Rosa, CA (US); Allen Sonneville, Keleyville, CA (US); John Farison, Santa Rosa, CA (US); John Avery, Cloverdale, CA (US); Tom Bahning, Santa Rosa, CA (US); Bruce Carlsen, Healdsburg, CA (US)

(73) Assignee: Calpine Corporation, Houston, TX (US)

( * ) Notice: Subject to any disclaimer, the term of this patent is extended or adjusted under 35 U.S.C. 154(b) by 0 days.

(21) Appl. No.: 13/006,554

(22) Filed: Jan. 14, 2011

(65) Prior Publication Data

US 2012/0183461 A1    Jul. 19, 2012

Related U.S. Application Data

(60) Provisional application No. 61/409,861, filed on Nov. 3, 2010.

(51) Int. Cl.
*B01D 53/64* (2006.01)

(52) U.S. Cl. ............................. 423/210; 423/DIG. 19

(58) Field of Classification Search .................. 423/210, 423/DIG. 19; 422/168
See application file for complete search history.

(56) References Cited

U.S. PATENT DOCUMENTS

| | | | |
|---|---|---|---|
| 3,855,387 A | 12/1974 | Brockmiller et al. | |
| 3,899,308 A | 8/1975 | Petersson | |
| 4,233,274 A | 11/1980 | Allgulin | |
| 5,698,171 A | 12/1997 | Trauffer et al. | |
| 6,197,269 B1 | 3/2001 | Jansen et al. | |
| 6,214,304 B1 | 4/2001 | Rosenthal et al. | |
| 6,284,199 B1 | 9/2001 | Downs et al. | |
| 6,294,139 B1 * | 9/2001 | Vicard et al. | .................. 423/210 |
| 6,328,939 B1 | 12/2001 | Amrhein | |
| 6,503,470 B1 | 1/2003 | Nolan et al. | |
| 6,576,092 B2 | 6/2003 | Granite et al. | |
| 6,649,132 B1 | 11/2003 | Hwang et al. | |
| 6,761,863 B2 | 7/2004 | Hwang et al. | |
| 6,855,859 B2 | 2/2005 | Nolan et al. | |
| 6,942,840 B1 | 9/2005 | Broderick | |
| 7,060,233 B1 | 6/2006 | Srinivas et al. | |
| 2002/0114749 A1 | 8/2002 | Cole | |
| 2003/0091490 A1 | 5/2003 | Nolan et al. | |
| 2003/0143140 A1 | 7/2003 | Hwang et al. | |
| 2004/0013589 A1 | 1/2004 | Vosteen et al. | |
| 2004/0086439 A1 | 5/2004 | Vosteen et al. | |
| 2006/0045829 A1 | 3/2006 | Dodwell et al. | |
| 2007/0207923 A1 | 9/2007 | Lu et al. | |

FOREIGN PATENT DOCUMENTS

| | | |
|---|---|---|
| CN | 1768904 | 5/2006 |
| CN | 1923337 | 7/2007 |
| CN | 101053752 | 10/2007 |
| EP | 1040864 A2 | 10/2000 |
| JP | 1245889 | 10/1989 |
| WO | 9806478 | 2/1998 |
| WO | 2004080574 | 9/2004 |

OTHER PUBLICATIONS

Massachusetts Institute of Technology Report, The Future of Geothermal Energy: Impact of Enhanced Geothermal Systems (EGS) on the United States in the 21st Century, Copyright 2006.

* cited by examiner

*Primary Examiner* — Timothy Vanoy

(74) *Attorney, Agent, or Firm* — Snell & Wilmer L.L.P.

(57) ABSTRACT

A system and method for removing contaminants from a gas stream is provided. The method can include the steps of reacting the gas stream with ozone to form solid contaminant particles and separating the solid contaminant particles from the gas stream. The solid contaminant particles can be separated from the gas stream using an adsorption material.

15 Claims, 5 Drawing Sheets

SYSTEM AND METHOD FOR REMOVING A CONTAMINANT FROM A GAS STREAM

CROSS REFERENCE TO RELATED APPLICATION

This application claims priority to U.S. Provisional Application No. 61/409,861, filed Nov. 3, 2010, entitled "SYSTEM AND METHOD FOR REMOVING A CONTAMINANT FROM A GAS STREAM."

FIELD OF INVENTION

The present invention generally relates to systems and methods for removing at least one contaminant from a gas stream and relates more specifically to removing a liquid contaminant from non-condensable gas streams.

BACKGROUND

Techniques and processes for generating electricity from a geothermal source are well-known. For example, it is well-known to convert geothermal steam to electricity using conventional steam turbines. In many such processes, the spent geothermal steam is subsequently released into the atmosphere.

Typically, liquid contaminant removal from a gas stream has been designed for stack emissions, for example, coal-fired boilers. Generally, such stack emissions are at temperatures above the vapor point of water and therefore such technology is not effective for spent geothermal steam. It is known to condense the contaminants out of a gas stream at very low temperatures. However, processing the gas at such low temperatures may also cause water to condense out of the gas stream, resulting in a contaminated effluent that must be stored and/or further treated. Furthermore, if a gas stream is non-condensable, then such methods to remove contaminants are not effective.

Hence, a need exists for new systems and methods for removing a contaminant from a non-condensable gas.

SUMMARY OF THE INVENTION

Accordingly, the present invention provides systems and methods of removing a contaminant from gaseous streams. In various embodiments, a method of mercury removal from a gaseous stream includes admixing ozone with a gaseous stream to form solid mercury sulfide and separating the solid mercury sulfide from the gas stream. In an aspect of the invention, the gaseous stream is a noncondensable gas stream containing hydrogen sulfide. The method can further include separating the solid mercury sulfide from the gas stream to adsorption material. The method can still further include cooling a temperature of the adsorption material below a temperature of the gas stream to facilitate adsorption of the mercury sulfide onto the surface of the adsorption material.

Furthermore, various embodiments of the present invention provide a system for removing mercury from spent geothermal steam containing hydrogen sulfide and water in the form of liquid, vapor, or a combination thereof. The system can comprise an ozone generator operable to producing effective amounts of ozone, a reactor operable to react the spent geothermal steam and ozone, and an adsorber in communication with the reactor and operable to absorb a particulate comprising mercury. An exemplary embodiment can include an absorption material maintained at a temperature below a temperature of the spent geothermal steam. In addition, the system can further include a hydrogen-sulfide abatement system operable to remove at least a portion of the hydrogen sulfide from the spent geothermal steam.

Further areas of applicability will become apparent from the description provided herein. It should be understood that the description and specific examples are intended for purposes of illustration only and are not intended to limit the scope of the present invention.

BRIEF DESCRIPTION OF THE DRAWINGS

The drawing figures described herein are for illustration purposes only and are not intended to limit the scope of the present invention in any way. The present invention will become more fully understood from the detailed description and the accompanying drawing figures wherein.

DETAILED DESCRIPTION

Figure 1:
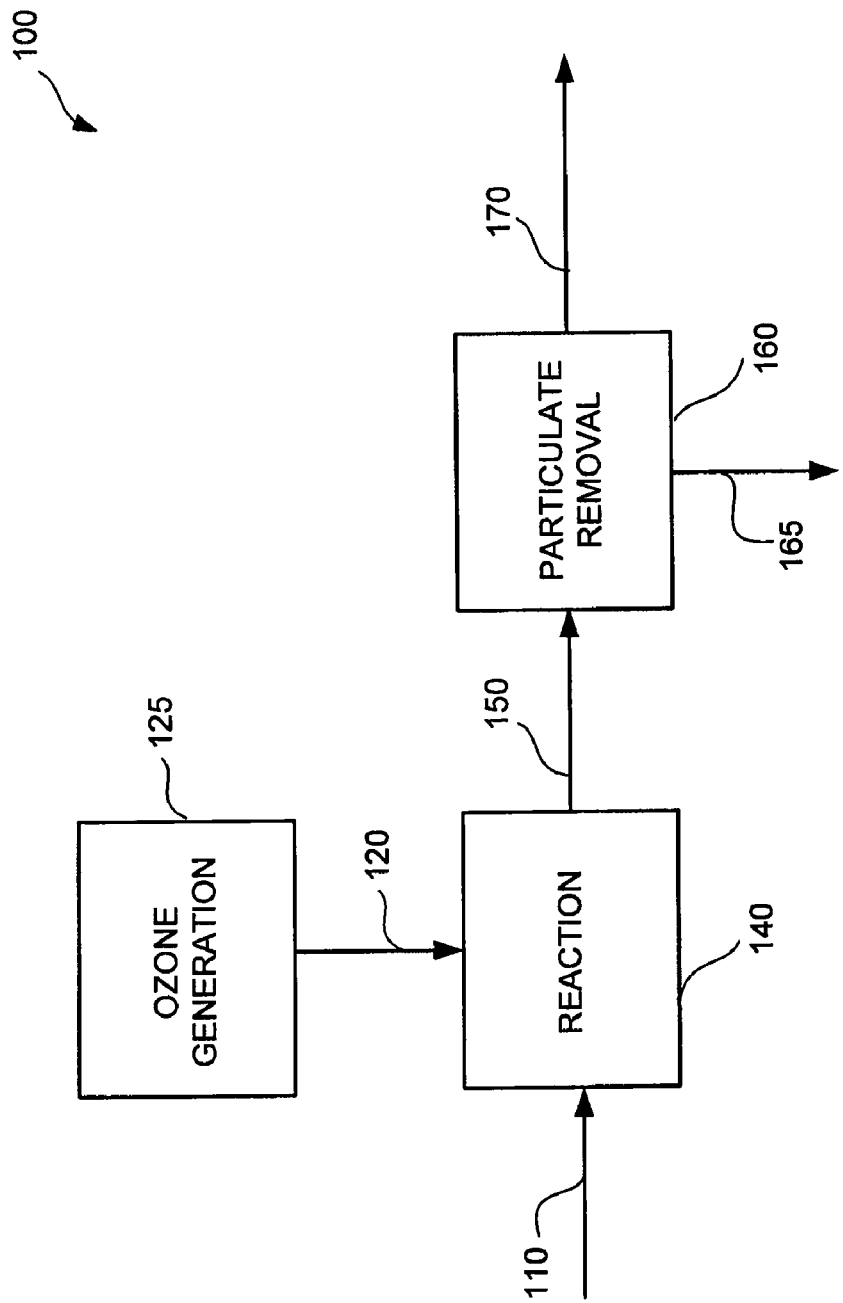
FIG. 1 is a block diagram illustrating a process of removing a contaminant from a gas stream according to various embodiments of the present invention.

The following description is merely exemplary in nature and is not intended to limit the present invention, its applications, or its uses. It should be understood that throughout the drawing figures, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present invention exhibits significant advances over the prior art methods and systems and enables significant improvements in contaminant removal, process efficiency, and/or provides economic benefits. Moreover, the existing geothermal power plants that emit spent geothermal steam may be, in many instances, retrofitted with the present invention to exploit any commercial benefits and environmental benefits that the present invention can provide.

The present invention generally relates to systems and methods for removing at least one contaminant from a gas stream and relates more specifically to removing a contaminant from noncondensable gas streams. A method can include the steps of reacting contaminants present in the gas stream with ozone to form solid contaminant particles and separating the solid particles from the gas stream. The method can also include adsorbing the solid particles onto an adsorption material.

A system can include an ozone generator operable to produce an effective amount of ozone, a reactor operable to react spent geothermal steam with the ozone, and an adsorber and communication with reactor operable to absorb a particulate. The system can further include at least one exit port from the absorber. The exit port may be configured to release steam and/or water. The system can also include a temperature controller, comparable to the absorber, the temperature controller maintaining a temperature of an adsorption material in the material in the adsorber below a temperature of the geothermal steam. The system can further include a hydrogen sulfide abatement system, which can be operable to remove at least a portion of hydrogen sulfide in the geothermal steam.

Moreover, the present invention provides a method for removing liquid contaminants, such as mercury, from a gas stream that contains hydrogen sulfide and water. The method can include mixing ozone in a gas stream to form a solid particle and separating the solid particulate from the gas stream. The method can also include removing at least a portion of hydrogen sulfide from the gas stream.

The present invention provides a method for removing mercury and hydrogen sulfide from a noncondensable gas stream. The method can include removing at least a portion of the hydrogen sulfide form the noncondensable gas stream to form a gas stream comprising less than 0.1% hydrogen sulfide, then reacting the gas stream with ozone to form mercury sulfide, and separating the mercury sulfide from the gas stream. The method can further include adsorbing the mercury sulfide onto an adsorption material.

Still further, the present invention provides a method of using a first contaminant in a gaseous stream to remove a second contaminant in a gaseous stream. The method can include reacting the first contaminant and the second contaminant with ozone to form a precipitate comprising the second contaminant, and then separating the precipitate comprising the second contaminant from the gas stream. The method can further include generating ozone. In addition, the method can include absorbing the precipitate comprising the second contaminant onto an absorption material. In an exemplary embodiment of the method, the gas stream can be a noncondensable gas stream, the first contaminant can be hydrogen sulfide, the second contaminant can be elemental mercury, and the precipitate can be mercury sulfide.

In various embodiments, a method of converting geothermal steam to electricity and removing hydrogen sulfide and contaminants from the geothermal steam is provided. The method can comprise the steps of converting energy contained in geothermal steam to electricity and spent geothermal steam, removing at least a portion of hydrogen sulfide from the spent geothermal steam, reacting ozone with the spent geothermal steam to form solid contaminant particles, and separating the particles from the spent geothermal steam.

Various embodiments of the present invention are useful in geothermal power plants which can include any geothermal power plant configuration known to those skilled in the art or developed hereafter. For example, common configurations for geothermal power plants include dry steam driven turbines, flash steam driven turbines, and binary cycle driven turbines. The present invention is especially useful in dry steam driven turbines and flash stream driven turbines, since spent geothermal steam is emitted into the environment. Typically, spent geothermal steam includes noncondensable gases, such as carbon dioxide and hydrogen sulfide and in addition can include some elemental metals such as boron, mercury, and arsenic. According to various embodiments of the present invention, when sending spent geothermal steam into the environment, at least a portion of mercury and/or hydrogen sulfide is removed from the spent geothermal steam before it exits into the environment. Typically spent geothermal steam can contain between about 90% and about 75% water vapor and may contain from about 0% to about 20% liquid water. Typical temperatures of geothermal steam range from about 50° C. to about 180° C. Those skilled in the art appreciate when temperature of spent geothermal steam is lower the greater the percentage of liquid water exists in the gas stream.

With reference to FIG. 1 a process of contaminant removal 100 is illustrated according to various embodiments of the present invention. Gas stream 110 can be mixed with ozone stream 120 in reaction area 140 to form gas stream containing precipitate 150. Ozone stream 120 can be generated by ozone generator apparatus 125. Gas stream containing precipitate 150 is then processed through particular removal apparatus 160 where the precipitate is removed to produce gas stream containing substantially no precipitate 170. Liquid water may exit particular removal apparatus 160 through condensate exit 165.

The gas stream 110 may comprise any gas that contains elemental mercury and hydrogen sulfide. In an exemplary embodiment, gas stream 110 is a non-condensable gas (NCG), such as geothermal steam. As discussed in more detail herein, the hydrogen sulfide may be naturally present the gas stream 110, may be added to gas stream 110, and/or partially removed from gas stream 110 to facilitate the reaction with ozone. In various embodiments, gas stream 110 comprises various substances in addition to hydrogen sulfide and mercury such as for example but not limited to carbon dioxide, hydrogen, methane, nitrogen, water, and the like.

The oxygen may be in any form that is suitable to facilitate a reaction of mercury and hydrogen sulfide in gas stream 110. For example, in an exemplary embodiment, the oxygen stream comprises ozone. In an exemplary embodiment, diatomic oxygen with sufficient energy to decompose to free radical oxygen may be used.

The oxygen may be supplied to gas stream 110 using any known or hereinafter devised means. Since the half life of ozone is very short, when ozone is used, the ozone is generated and supplied on-site. For example, one or more ozone generator apparatus 125, such as corona discharge generators, ultraviolet light generators and cold plasma generators may be used to create the ozone. In other embodiments, the ozone may be generated off-site. However, ozone quickly decays into diatomic oxygen and is therefore typically not easily stored or transported.

Because of the uncertainty regarding reaction mechanisms, it is difficult to establish with certainty the reaction path of the mercury, hydrogen sulfide and oxygen components. However, without being bound to the theory, it is thought that the solid mercury sulfide may be formed through one or a combination of the three reaction paths provided below:

$$H_2S_{(g)}+O_{3(g)} \rightarrow H_2O+O_2+S^0_{(s)}$$

$$S^0_{(s)}+Hg^0_{(g)} \rightarrow HgS_{(s)} \quad \text{Reaction Path 1:}$$

$$Hg^0_{(g)}+O_{3(g)} \rightarrow HgO_{(s)}+O_2$$

$$HgO_{(s)}+H_2S \rightarrow HgS_{(s)}+H_2O \quad \text{Reaction Path 2:}$$

$$Hg^0_{(g)}+H_2S_{(g)} \rightarrow (O_3 \text{ present}) \rightarrow HgS_{(s)}+H_2 \quad \text{Reaction Path 3:}$$

In various embodiments, ozone is added in an amount effective to cause the desired amount of elemental mercury vapor to react to form mercury sulfide. For example, an effective amount of ozone may be in the range of about 1 pmmv to about 100 pmmv. In one embodiment, such as when complete reaction of the elemental mercury vapor is desired, excess ozone is added to the gas stream. In various embodiments, ozone stream 120 is mixed with gas stream 110 at a temperature and pressure to cause a desired amount of mercury to react to mercury sulfide. For example, ozone stream 120 and gas stream 110 may be mixed at a temperature in the range from about 50 to about 180° Celsius or preferably for about 60° C. to about 100° C. or more preferably from about 70° C. to about 90° C. In addition, for example, ozone stream and gas stream may be mixed in a pressure in a range from about 1 ATM to about 10 ATM, or more preferably from about 1 ATM to about 5 ATM, or more preferably from about 1 ATM to about 2 ATM.

As mentioned above, after a gas stream and ozone are reacted to form solid mercury sulfide, the solid mercury sulfide can be separated from the gas stream using particulate removal apparatus 160. The particulate removal apparatus 160 may comprise any device, system or method for removing all or a portion of the solid mercury sulfide from a gas stream. In various embodiments, particulate removal apparatus 160 comprises an adsorption material operable to allow the solid mercury sulfide to adhere to its surface as will be appreciated by those skilled in the art, any suitable adsorption material such as for example plastic packaging material, ventilated plastic balls, various packaging materials, and glass beads may be used. In various embodiments, the adsorption material has a relatively large surface area and/or is porous.

In various embodiments, the flow rate of a gas stream through particulate removal apparatus 160 and/or the volume of the particulate removal apparatus 160 may be varied to alter the residence time of gas stream within the particulate removal apparatus 160, thereby affecting the adsorption of a precipitate such as for example the mercury sulfide. In various embodiments, the flow rate of gas stream through the particulate removal apparatus 160 may be in the range of about 0.01 to about 5 meters/second and the volume of the particulate removal apparatus 160 may be in the range of about 100 to about 5,000 gallons. However it will be understood that any gas stream flow rate and any size particulate removal apparatus 160 may be used.

In various embodiments, temperature differential between the gas stream and the adsorption material in particulate removal apparatus 160 can be employed to facilitate deposition of precipitate or to adsorber material of particulate removal apparatus 160. For example, the adsorption material may be relatively cool compared to the temperature of the gas stream. In an embodiment, the temperature of the adsorption material may be in the range of about 25° C. to about 95° C. or preferably from about 25° C. to about 70° C. or more preferably from about 25° C. to about 50° C. In an aspect of the present invention, a temperature controller may be added to particle removal apparatus 160 either exits through its exterior or interior to control a temperature of the adsorption material controlling temperature of the adsorption material may increase the amount of a precipitate such as for example hydrogen sulfide is collected on adsorption material and as such minimizes any emittance of such a contaminant into the environment.

During operation, the adsorption material may become laden with solid mercury sulfide, which may restrict flow of a gas stream and reduce the efficacy of mercury removal. As such, in various embodiments, the adsorption material may be cleaned and/or replaced. For example, the adsorption material may be removed from the particulate removal apparatus 160 and washed with a cleaning solution, such as water. The adsorption material may be cleaned without removal from the particulate removal apparatus 160. For example, the particulate removal apparatus 160 may be filled with a cleaning solution and agitated to loosen the mercury sulfide from the adsorption material, the cleaning solution may then be drained from the particulate removal apparatus 160. In another example, adsorption material may be replaced or the entire particulate removal apparatus 160 comprising adsorption material may be replaced.

In various embodiments, the gas stream 110 contains a relatively optimal amount of hydrogen sulfide or excess amounts of hydrogen sulfide to allow the mercury and hydrogen sulfide components to react substantially to completion. For example, gas stream 110 is geothermal steam and a relatively optimal amount of hydrogen sulfide to react substantially all of the elemental mercury in gas stream 110 to solid mercury sulfide may be in the range of less than about 0.1% hydrogen sulfide by volume of gas stream 110. In various embodiments, a relatively optimal amount of hydrogen sulfide may be naturally present in gas stream 110. In such embodiments, the natural presence of one contaminant (e.g., hydrogen sulfide), is used to facilitate the removal of another contaminant (e.g., elemental mercury). In accordance with the various embodiments, the present invention provides methods for removing mercury and hydrogen sulfide, a noncondensable gas stream. A method can comprise removing at least a portion of the hydrogen sulfide from the noncondensable gas stream to form a gas stream comprising less than about 0.1 percent hydrogen sulfide, then reacting the reacting the gas stream with ozone to form mercury sulfide, and separating the mercury sulfide from the gas stream. The method can also include absorbing the mercury sulfide onto absorption material and the absorption material can be a temperature below the temperature of the non-condensable gas stream.

Figure 2:
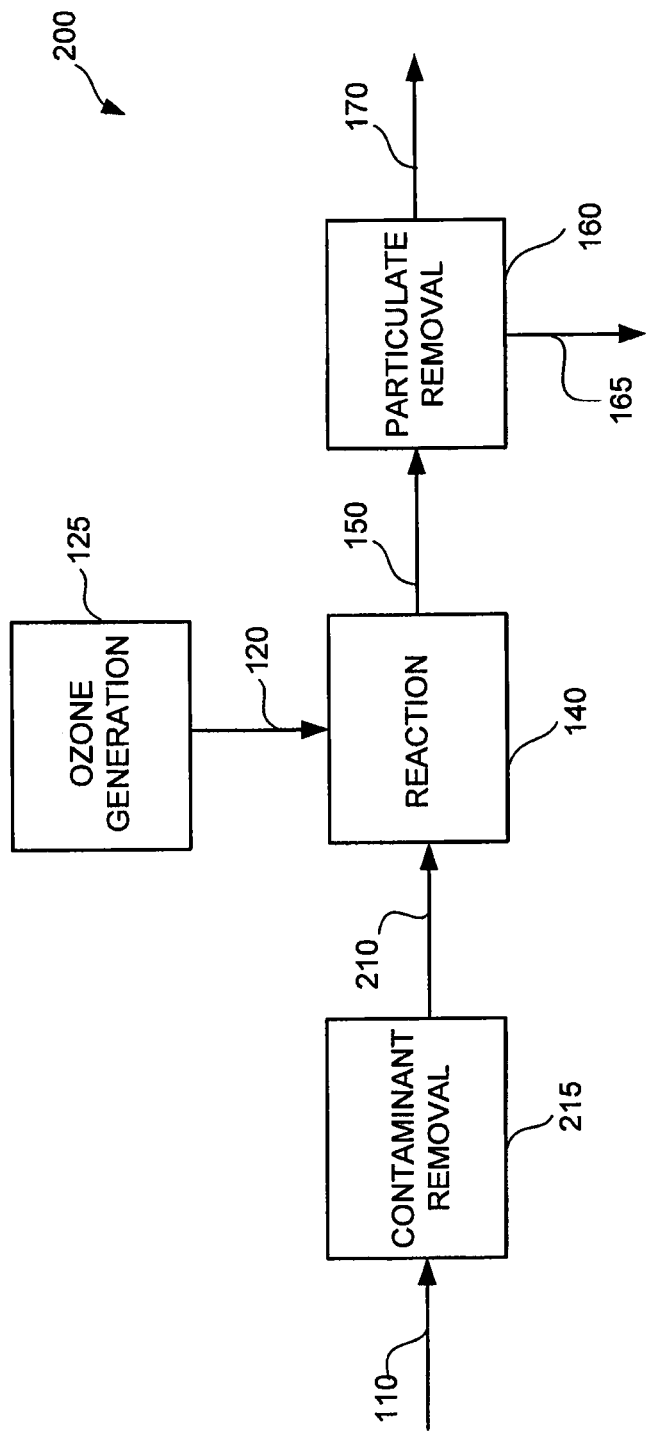
FIG. 2 is a block diagram illustrating a process of removing two contaminants from a gas stream according to various embodiments of the present invention.

With reference to FIG. 2 a process of removing two contaminants from a gas stream is illustrated according to various embodiments of the present invention. Contaminant removal process 200 comprises gas stream 110, contaminant removal apparatus 215, gas stream minus contaminant 210, ozone generation apparatus 125, ozone stream 120, reaction area 140, gas stream containing mercury sulfide 150, particle removal apparatus 160, gas stream containing minimal or no mercury 170, and condensation exit 165. Gas stream 110 can enter contaminant removal apparatus 215 for removal of any contaminant in gas stream 110. For example, contaminant removal apparatus 215 may remove substantially all of a contaminant targeted in a gas stream 110. In accordance with an aspect of the present invention, contaminant removal apparatus 215 can remove at least a portion of hydrogen sulfide contained in gas stream 110. Gas stream minus contaminant 210 exits contaminant removal apparatus 215 and enters reaction area 140. Ozone generation apparatus 125 generates ozone stream 120, which is directed to reaction area 140. In reaction area 140, ozone from ozone stream 120 interacts with at least one contaminant in gas stream minus contaminant 210 to produce a precipitate. In accordance with an aspect of the present invention, ozone from ozone stream 120 reacts with gas stream minus contaminant 210 in reaction area 140 to produce a precipitate that is mercury sulfide. Gas stream containing precipitate 150 exits reaction area 140 and enters particulate removal apparatus 160. As gas stream containing precipitate 150 flows through particulate removal apparatus 160, the precipitant is trapped in particulate removal apparatus 160 allowing gas stream containing substantially no precipitate 170 to exit particulate removal apparatus 160. A condensate such as water may also be trapped in particulate removal apparatus 160, and such condensate may exit particulate removal approval 160 via condensate exit 165.

Various embodiments of the present invention can comprise a method removing a contaminant from a gas stream and forming a gas stream containing a minimal amount of the contaminant. The method can also comprise reacting ozone with the gas stream containing a minimal amount of the contaminant and creating a precipitate comprising a second contaminant in the gas stream. The method can also comprise separating the precipitate from the gas stream. In an exemplary embodiment of the present invention, a method for removing mercury can include removing a portion of hydrogen sulfide from geothermal steam and then reacting the geothermal steam with ozone to create mercury sulfide. The mercury sulfide can be removed from the geothermal steam by adsorbing the mercury sulfide onto an adsorption material.

The hydrogen sulfide may be removed from the gas stream using any known or hereinafter devised device, system or method. For example, a hydrogen sulfide abatement system may be used to remove at least a portion of hydrogen sulfide from the gas stream. In an embodiment, the hydrogen sulfide abatement system comprises iron catalysts that convert the hydrogen sulfide into solid elemental sulfur that precipitates out of the gas stream. In an embodiment, sulfur bacteria are used to metabolize the hydrogen sulfide into sulfates. Moreover, when the gas stream is a non-condensable gas, the Stretford method may be used to remove the hydrogen sulfide. Using this method, the non-condensable gas is contacted with an aqueous alkaline solution to form a hydrogen sulfide precipitate.

In various embodiments of the present invention, the hydrogen sulfide may be added or removed at any time during the mercury removal process. For example, in various embodiments, hydrogen sulfide can be removed from gas stream 110 before ozone 120 is admixed. With reference to FIG. 2, a process 200 of mercury removal which removes at least a portion of hydrogen sulfide before admixing ozone 120 in the gas stream 110 containing a minimal amount of hydrogen sulfide is illustrated. Accordingly, a method with a contaminant removal can comprise the removing at least a portion of hydrogen sulfide from gas stream 110 via contaminant removal 215 to yield intermediary system 210 reacting intermediary stream 210 with ozone 120 produced by ozone generation 125, forming solid mercury sulfide, removing the solid mercury sulfide from second intermediary stream 150 via particulate removal apparatus 160 to produce gas stream substantially free of mercury 170.

Figure 3:
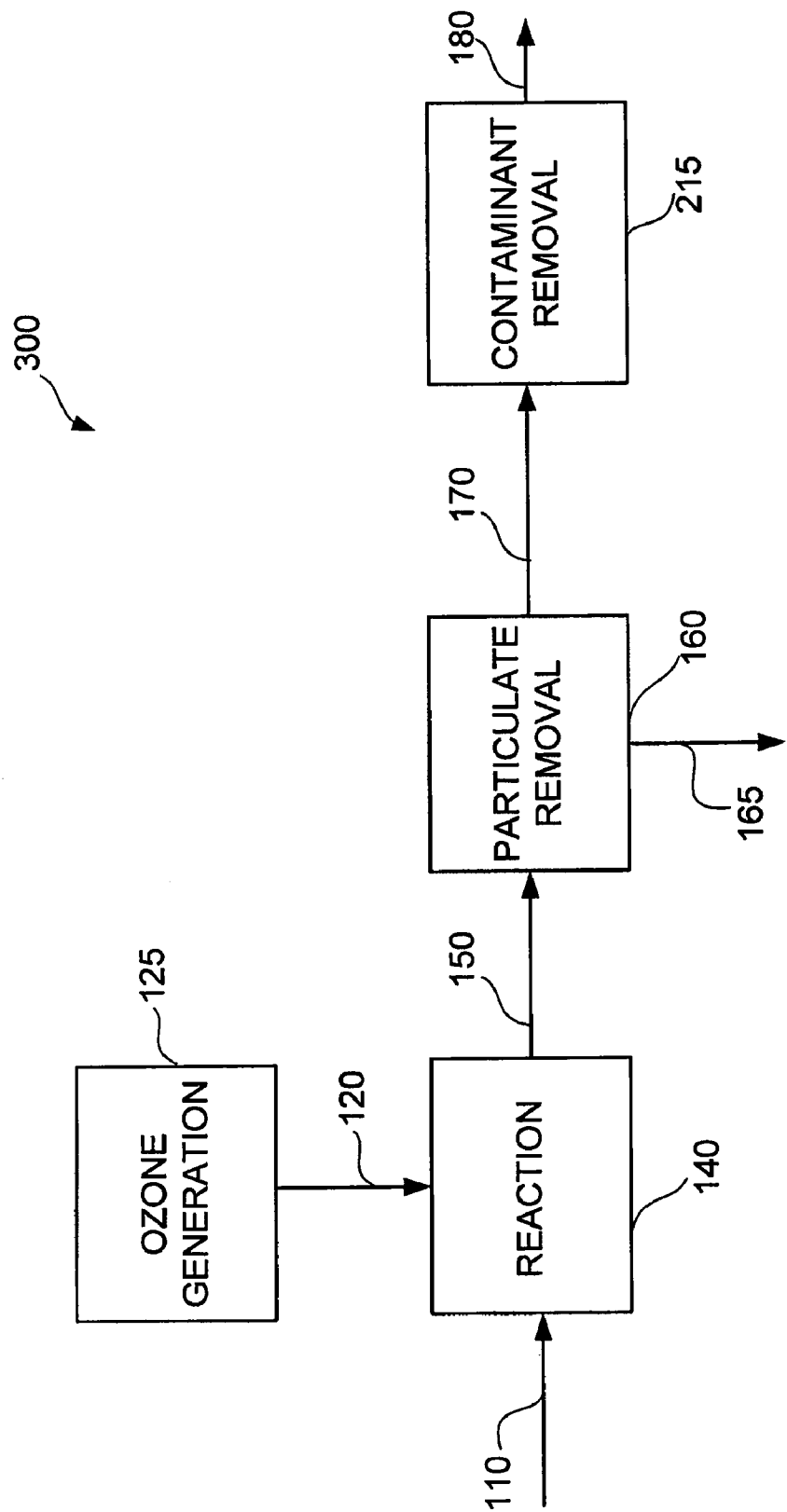
FIG. 3 is a block diagram illustrating a process of removing two contaminants from a gas stream according to various embodiments of the present invention.

With reference to FIG. 3, a process of removing two contaminants from a gas stream is illustrated according to various embodiments of the present invention. Contaminant removal process 300 comprises gas stream 110, which can be mixed in a reactionary 140 with ozone 120, which can be produced by ozone generation apparatus 125. In the reaction area 140, ozone 120 reacts with gas stream 110 to produce a particulate comprising a first contaminant 150. Gas stream 110 containing particulates comprising first contaminant 150 exits reaction area 140 and enters particulate removal apparatus 160. Particulate removal apparatus 160 removes precipitate comprising first contaminant 150 from the gas stream 110. In an exemplary embodiment, a precipitate comprising first contaminant 150 of gas stream 110 is mercury sulfide. A condensate can also be produced in particulate removal apparatus 160 and exit via condensate exit 165. Condensate may be used in other processes in a geothermal steam generation plant. Gas stream containing minimal amounts of contaminant 170, exits particulate removal apparatus 160 and enters contaminant removal apparatus 215. Contaminant removal apparatus 215 removes a second contaminant from gas stream containing a minimal amount of first contaminant 170 thus producing gas stream comprising minimal to no amounts of first contaminant and second contaminant 180, which exits removal apparatus 215. Gas stream containing minimal to no amounts of first contaminant or second contaminant 180 may be emitted into the environment.

In various embodiments, excess hydrogen sulfide can be removed after oxygen has reacted with the gas stream and the solid mercury sulfide has been separated from the gas stream. In accordance with various exemplary embodiments of the present invention, process 300 removes excess hydrogen sulfide after the removal of mercury from a gas stream. In accordance with an aspect of the present invention, a method comprises admixing gas stream 110 with ozone stream 120, forming solid mercury sulfide, removing the solid mercury sulfide, removing excess hydrogen sulfide from stream 170, and producing stream 180 that is substantially free of mercury and hydrogen sulfide contaminants.

Figure 4:
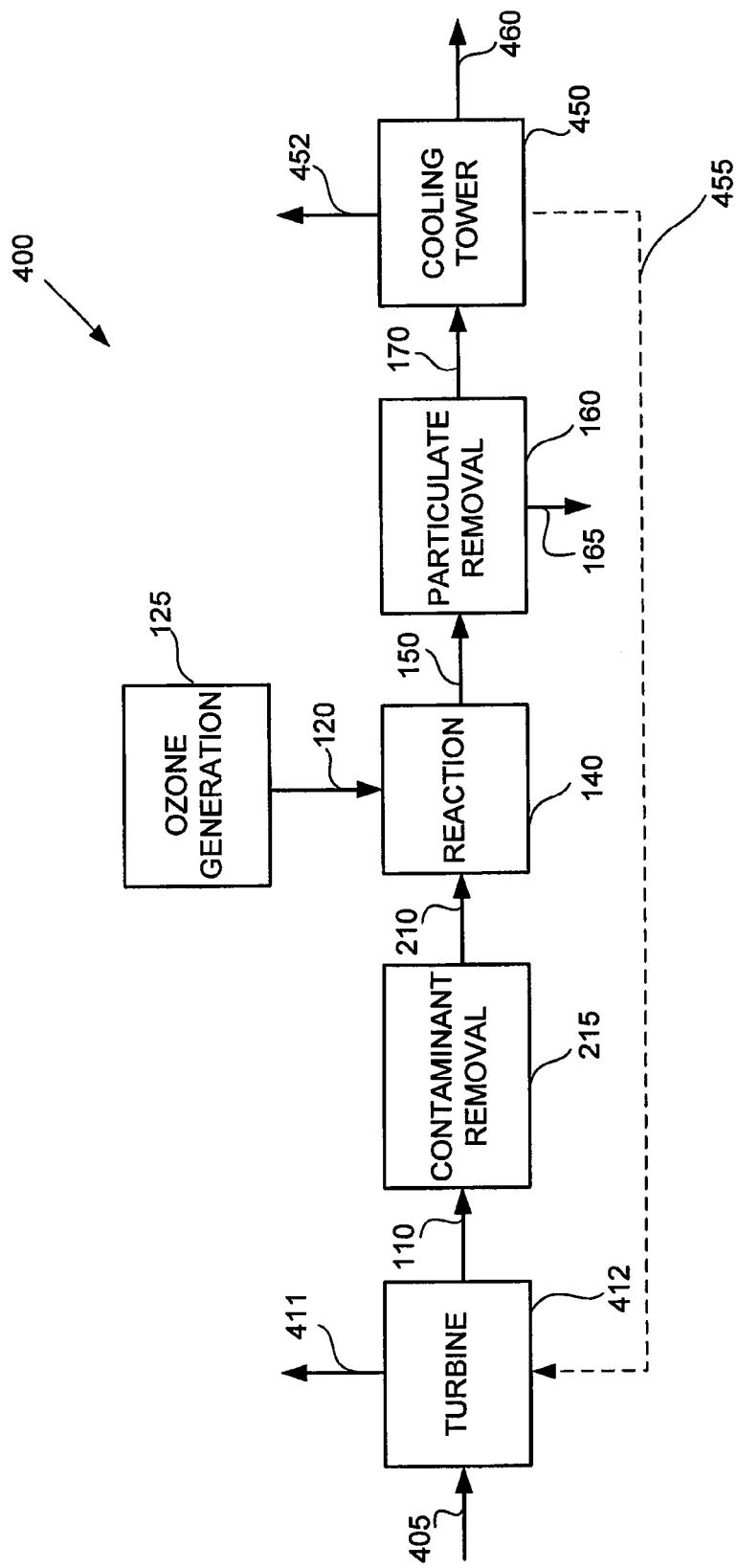
FIG. 4 is a block diagram illustrating a process of generating energy from a geothermal source according to various embodiments of the present invention.

Now referring to FIG. 4, a process of generating energy from a geothermal source is illustrated according to various embodiments of the invention. Geothermal steam 405 enters turbine 412 and produces energy in the form of electricity 411 which can be directed to the grid in use by consumers. Turbine 410 also generates spent geothermal gas stream 110, which can enter contaminant removal 215. Gas stream comprising minimal amounts of contaminant 210 exits contaminant removal apparatus 215 and enters reaction area 140 where it is a mixed with ozone 120 that is generated by ozone generation apparatus 125. While in reaction area 140, a precipitate comprising a second contaminant is formed. A gas stream comprising the precipitate containing the second contaminant 150 exits the reaction area 140 and enters particulate removal apparatus 160. The precipitate comprising the second contaminant is removed from the gas stream in the particulate removal apparatus 160. A gas stream comprising minimal amounts of a first contaminant and a second contaminant 170 exits a particulate removal apparatus 160 and enters cooling tower 450.

Steam 452 can be released into the environment in cooling tower 450 as well as liquid water 460 can be collected from cooling tower. Cooling tower can have a recycle 455 to recycle water either in water vapor or liquid back to turbine to increase the efficiency of the geothermal plant. It will be appreciated by those skilled in the art that a turbine cooling tower can be used with any configuration described herein including contaminant removal process 100, contaminant removal process 200, and contaminant removal process 300. For example, as illustrated in contaminant removal process 300, whereas contaminant removal 215 is placed after particulate removal apparatus 160, and the exit from contaminant removal apparatus 215 may be directed to the cooling tower. In another example, as illustrate in FIG. 1, contaminant removal apparatus 215 does not exist, and turbine spent steam 110 from turbine 412 can enter directly into reaction area 140 and gas stream 170 exiting from particulate removal apparatus 160 may be directed to cooling tower 450.

In various embodiments, a method of converting geothermal steam to electricity and removing hydrogen sulfide and mercury contaminants can comprise converting energy contained in geothermal steam to electricity, removing at least a portion of hydrogen sulfide from the geothermal steam, reacting ozone with the hydrogen sulfide contained in the geothermal steam to form solid mercury sulfide and separating the solid mercury sulfide from the geothermal steam.

Figure 5:
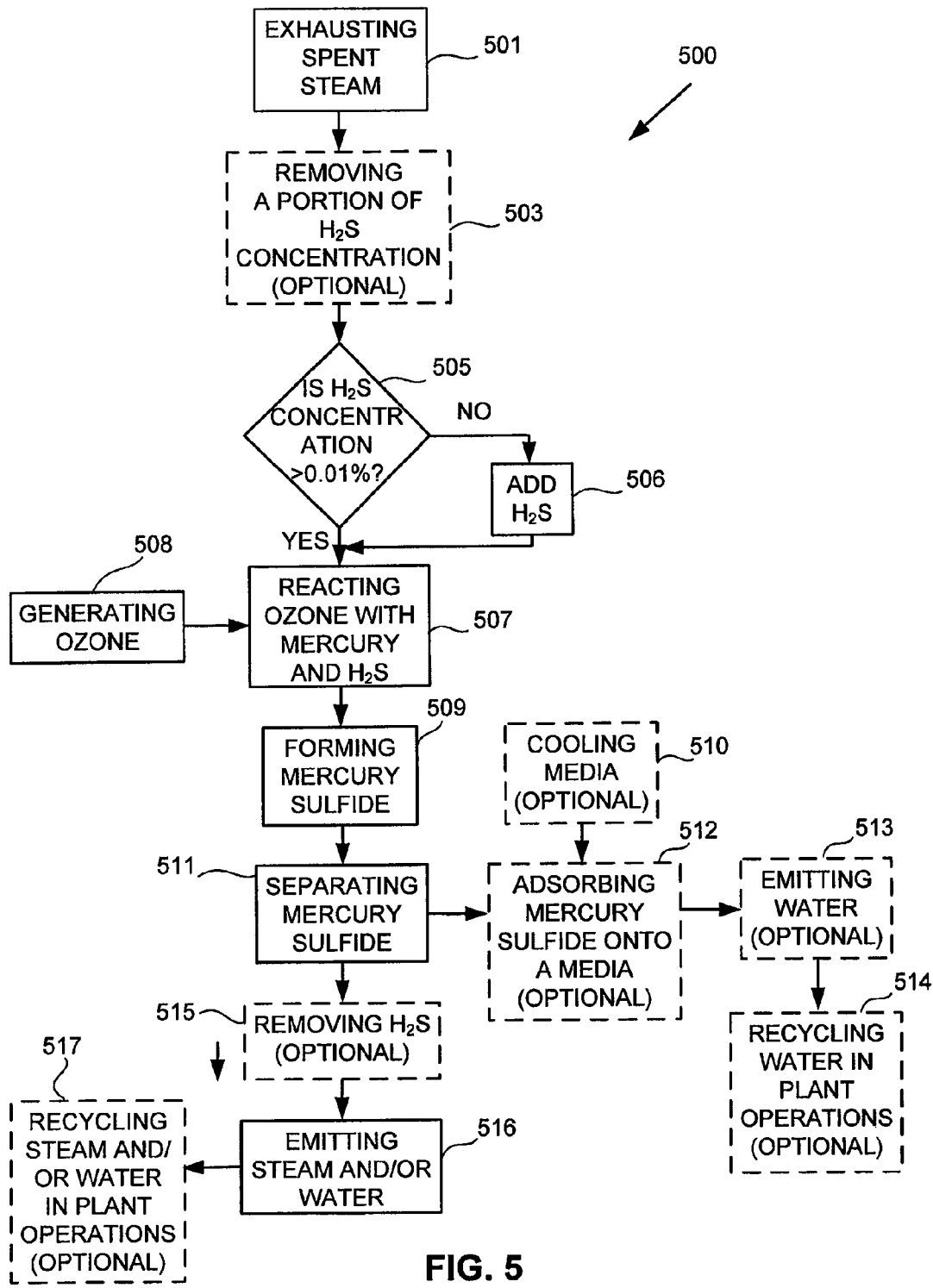
FIG. 5 is a block diagram illustrating a method of removing at least a one contaminant from a gas stream according to various embodiments of the present invention.

Now with reference to FIG. 5, a method of removing a contaminant from a gas stream is illustrated according to various embodiments of the present invention. Process 500 can be a process for removing mercury from a geothermal gas stream. In various embodiments of the present invention, a method includes exhausting spent steam 501 from a geothermal turbine. Exhausted spent steam can be in a pipe, a flue may come from a condenser, or any known device, apparatus, or method for communicating spent steam into process 500. In various embodiments of the present invention, exhausting spent steam 501 is equivalent to gas stream 110 as previously discussed herein. After exhausting spent steam 501, optionally the method can include removing a portion of hydrogen sulfide concentration 503 in the spent steam. A calculation of hydrogen sulfide concentration 505 may be done instantaneously, periodically, or once on an initial setup of the process 500. For example, a meter may be inserted into the spent steam flow to determine the hydrogen sulfide concentration 505. If hydrogen sulfide concentration 505 is less than 0.01%, the method can include adding hydrogen sulfide 506 to the stream. If hydrogen sulfide concentration 505 is greater than 0.01%, then the stream is sent to the next step. Stream enters the reacting ozone with mercury and hydrogen sulfide 507. The generating of ozone 508 allows ozone to come in contact with spent stream. The reacting ozone with mercury and hydrogen sulfide 507 then moves to forming mercury sulfide 509. The reaction of ozone with elemental mercury and hydrogen sulfide forms mercury sulfide as discussed herein. The forming of mercury sulfide 509 allows mercury sulfide to be formed as a particulate in a stream of the spent geothermal steam. The mercury sulfide particulate is separated in a separating mercury sulfide 511 step. The separating mercury sulfide 511 step can optionally include adsorbing a mercury sulfide onto a media 512 and can further optionally include cooling the media 510. Adsorbing mercury sulfide onto a medium 510 can also produce water and can include the step of emitting water 513 and such emitted water may include recycling water in plant operations 514 which is optional. Back to separating the mercury sulfide 511, this can lead to a removing of hydrogen sulfide 515, which is optional after separating mercury sulfide 511. The method can include emitting steam and/or water 516. Emitting steam and or water may be done at cooling tower and the water and/or steam may be emitted into the environment. Emitting steam and/or water steam 516 may include recycling steam and/or water in plant operations 517, which is optional.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein.

Various embodiments and the examples described herein are exemplary and not intended to be limiting in describing the full scope of compositions and methods of this invention. Equivalent changes, modifications and variations of various embodiments, materials, compositions and methods may be made within the scope of the present invention, with substantially similar results.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method for removing mercury and hydrogen sulfide from a non-condensable gas stream, the method comprising:
    removing at least a portion of the hydrogen sulfide from the non-condensable gas stream to form a gas stream comprising less than about 0.1% hydrogen sulfide;
    reacting the gas stream with ozone to form mercury sulfide; and
    separating the mercury sulfide from the gas stream.

2. The method according to claim 1, further comprising adsorbing the mercury sulfide onto an adsorption material.

3. The method according to claim 2, wherein the adsorption material is selected from a group consisting of a plastic packaging material, plastic spheres and glass beads.

4. The method according to claim 2, wherein a temperature of the adsorption material is below a temperature of the gas stream.

5. The method according to claim 4, wherein the temperature of the adsorption material is in a range of 25° Celsius to 95° Celsius.

6. The method according to claim 1, wherein the at least a portion of the hydrogen sulfide is removed from the non-condensable gas stream with a hydrogen sulfide abatement system.

7. The method according to claim 1, wherein the hydrogen sulfide is removed before the step of admixing the ozone with the hydrogen sulfide.

8. The method according to claim 1, wherein the hydrogen sulfide is removed after the step of admixing the ozone with the hydrogen sulfide.

9. The method according to claim 1, wherein the hydrogen sulfide is contacted with an aqueous alkaline solution to form a hydrogen sulfide precipitate.

10. The method according to claim 1, further comprising generating the ozone on-site.

11. The method according to claim 1, wherein the non-condensable gas stream is geothermal steam.

12. The method according to claim 1, wherein an effective amount of ozone sufficient to achieve complete reaction of mercury is reacted with the gas stream.

13. The method according to claim 1, wherein a concentration of ozone reacted with the gas stream is in a range of 1 ppmv to 100 ppmv.

14. The method according to claim 1, wherein the gas stream is mixed with the ozone at a temperature in a range of 50° Celsius to 180° Celsius.

15. The method according to claim 1, wherein the gas stream is mixed with the ozone at a pressure in a range of 1 ATM to 10 ATM.

* * * * *